(12) United States Patent
Kato et al.

(10) Patent No.: US 7,703,989 B2
(45) Date of Patent: Apr. 27, 2010

(54) OPTICAL CONNECTOR

(75) Inventors: Yoshihisa Kato, Hitachi (JP); Kanako Suzuki, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 12/000,896

(22) Filed: Dec. 18, 2007

(65) Prior Publication Data

US 2008/0304794 A1    Dec. 11, 2008

(30) Foreign Application Priority Data

Jan. 15, 2007  (JP) ............................. 2007-006051

(51) Int. Cl.
 *G02B 6/36* (2006.01)
(52) U.S. Cl. .......................................... 385/78; 385/73
(58) Field of Classification Search ................ 385/100, 385/102, 103, 104, 106, 109, 115, 116, 119, 385/123
See application file for complete search history.

(56) References Cited

U.S. PATENT DOCUMENTS

| | | | | |
|---|---|---|---|---|
| 4,330,171 A * | 5/1982 | Malsot et al. | ................ | 385/80 |
| 4,341,439 A * | 7/1982 | Hodge | ................ | 385/59 |
| 4,421,383 A * | 12/1983 | Carlsen | ................ | 385/79 |
| 4,448,483 A * | 5/1984 | Ryley, Jr. | ................ | 385/68 |
| 4,466,009 A * | 8/1984 | Konishi et al. | ................ | 257/432 |
| 4,484,796 A * | 11/1984 | Sato et al. | ................ | 385/72 |
| 4,509,827 A * | 4/1985 | Cowen et al. | ................ | 356/153 |
| 4,545,643 A * | 10/1985 | Young et al. | ................ | 385/78 |
| 4,629,284 A * | 12/1986 | Malavieille | ................ | 385/70 |
| 4,781,431 A * | 11/1988 | Wesson et al. | ................ | 385/79 |
| 4,877,300 A * | 10/1989 | Newhouse et al. | ................ | 385/43 |
| 4,900,118 A * | 2/1990 | Yanagawa et al. | ................ | 385/24 |
| 5,257,332 A * | 10/1993 | Pimpinella | ................ | 385/59 |
| 5,519,799 A * | 5/1996 | Murakami et al. | ................ | 385/78 |
| 5,631,985 A * | 5/1997 | Yamada et al. | ................ | 385/59 |
| 5,633,968 A * | 5/1997 | Sheem | ................ | 385/53 |
| 5,796,896 A * | 8/1998 | Lee | ................ | 385/59 |
| 5,870,514 A * | 2/1999 | Myslinski et al. | ................ | 385/56 |
| 6,220,764 B1 * | 4/2001 | Kato et al. | ................ | 385/92 |
| 6,288,846 B1 * | 9/2001 | Stoner, Jr. | ................ | 359/666 |
| 6,334,019 B1 * | 12/2001 | Birks et al. | ................ | 385/125 |
| 6,457,877 B2 * | 10/2002 | Kato et al. | ................ | 385/92 |
| 6,470,106 B2 * | 10/2002 | McClelland et al. | ................ | 385/16 |
| 6,726,375 B2 * | 4/2004 | Kato et al. | ................ | 385/88 |
| 6,839,475 B2 * | 1/2005 | Kawase et al. | ................ | 385/14 |
| 7,393,143 B2 * | 7/2008 | Kato et al. | ................ | 385/73 |

(Continued)

FOREIGN PATENT DOCUMENTS

JP    55-153912 A    12/1980

(Continued)

*Primary Examiner*—Frank G Font
*Assistant Examiner*—Peter Radkowski
(74) *Attorney, Agent, or Firm*—Foley & Lardner LLP

(57) ABSTRACT

An optical connector has a ferrule, an optical fiber connector disposed at an back end of the ferrule, an internal optical fiber inserted into the ferrule and the optical fiber connector, the internal optical fiber being adapted to butt-connect at a back end face thereof to an external optical fiber to be inserted into the optical fiber connector, and a refractive index matching body attached to the back end face of the internal optical fiber. The refractive index matching body has a cross-linked and hardened cross-linkable refractive index matching agent including a stress-strain relaxation agent.

26 Claims, 9 Drawing Sheets

U.S. PATENT DOCUMENTS

| | | | |
|---|---|---|---|
| 2001/0009599 A1* | 7/2001 | Kato et al. | 385/92 |
| 2002/0197026 A1* | 12/2002 | Kato et al. | 385/92 |
| 2003/0138187 A1* | 7/2003 | Kawase et al. | 385/14 |
| 2003/0185520 A1* | 10/2003 | Bookbinder et al. | 385/73 |
| 2004/0165840 A1* | 8/2004 | Kato et al. | 385/92 |
| 2005/0238308 A1* | 10/2005 | Hasegawa et al. | 385/125 |
| 2006/0204195 A1* | 9/2006 | Kurosawa et al. | 385/125 |
| 2007/0196055 A1* | 8/2007 | Kato et al. | 385/78 |

FOREIGN PATENT DOCUMENTS

| | | | |
|---|---|---|---|
| JP | 58192010 A | * | 11/1983 |
| JP | 61204608 A | * | 9/1986 |
| JP | 02281213 A | * | 11/1990 |
| JP | 26726705 B2 | | 7/1997 |
| JP | 11-072641 A | | 3/1999 |
| JP | 11-101919 A | | 4/1999 |
| JP | 2001-324641 A | | 11/2001 |

* cited by examiner

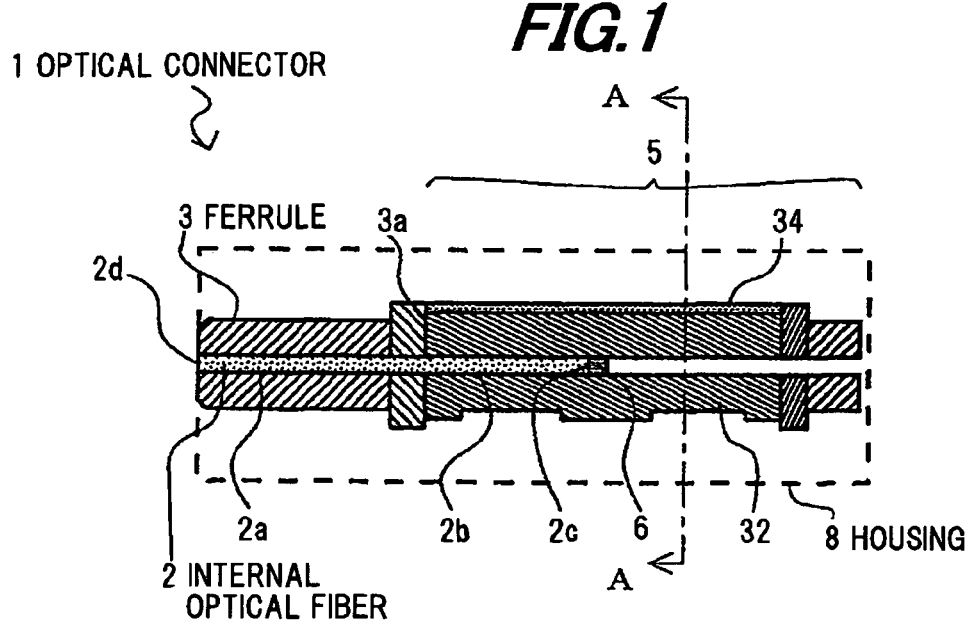
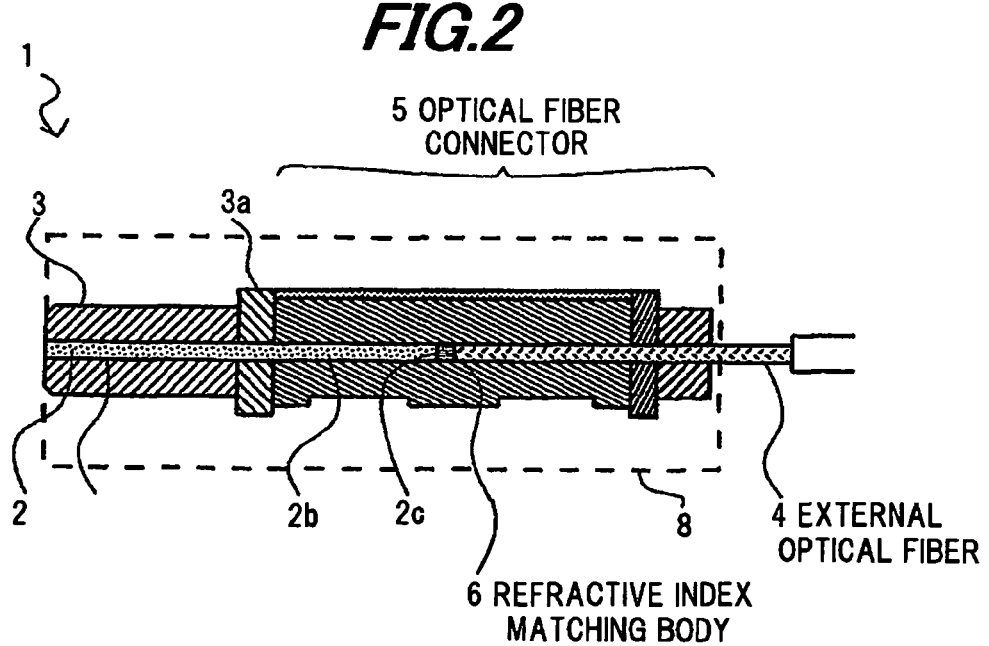

OPTICAL CONNECTOR

The present application is based on Japanese patent application No.2007-006051 filed on Jan. 15, 2006, the entire contents of which are incorporated herein by reference.

BACKGROUND OF THE INVENTION

1. Field of the Invention

This invention relates to an optical connector and, in particular, to an optical connector that is capable of easy connecting a holey fiber at a setting site thereof.

2. Description of the Related Art

At present, in order to connect optical fibers, a physical connecting method is widely used that is conducted by butting against each other end faces of the optical fibers.

The physical connecting method includes a connecting method using a mechanical splice and a connecting method using an optical connector.

At the connection work site of the optical fibers, for example, an optical connector is used that is composed of a ferrule and an optical fiber connector which is connected with the ferrule and in which an internal optical fiber is housed. The connection work is conducted by butting the end face of another optical fiber against the end face of the internal optical fiber (the housed fiber) in the optical fiber connector.

In the physical connecting method, a profile of the end face of optical fiber can seriously affect its connection characteristics. For example, when an angle (i.e., an angle to the optical fiber axis) of the end face of the optical fiber deviates from a right angle or the end face of the optical fiber is highly roughened, air may enter in a space between the end face of the optical fibers to butt and contact each other. As a result, Fresnel reflection increases at the end face of the optical fiber to cause an increase in connection loss of the optical fiber. A method for preventing the increase in connection loss of the optical fiber due to the roughness of the end face of the optical fiber is known that the end face of the optical fiber or the ferrule is polished after cutting the optical fiber.

Another method is known that the optical fibers are connected each other without polishing the end face of the optical fiber or the ferrule after cutting the optical fiber. This method is conducted such that a refractive index matching agent in liquid or grease state is interposed between the end faces of the optical fibers, where the agent has a refractive index similar to that of a core of the optical fiber (See JP-A-11-72641 and JP-A-11-101919). In this method, the refractive index matching agent is coated on the end face of the optical fibers, or filled into a connection portion of the optical fibers, and then the optical fibers are butted each other. Thus, air can be prevented from entering into the space between the end faces of the optical fibers, the Fresnel reflection caused by the air can be lowered, and the connection loss of the optical fiber can be reduced.

Another method is known that uses a refractive index matching film (See JP-B-2676705, JP-A-2001-324641 and JP-A-55-153912).

However, the method of polishing the end face of the optical fibers is not suitable in case of using a holey fiber as the external optical fiber or in case of conducting the connection work at the setting site of the optical fiber.

When the optical fibers are connected at the setting site, a lot of time consumption and labor charge are required for polishing the end face of the optical fibers etc., and a polishing device must be prepared at the setting site for polishing the end face of the optical fibers etc. Thus, the method is not suitable for connecting the optical fibers at low cost and simply.

Further, when the end face of the holey fiber is polished, a polishing residue generated during the polishing process and an abrasive agent used during the polishing process may enter the hole portion of the holey fiber to cause an increase in connection loss and a reduction in reliability.

On the other hand, the method of interposing the liquid or grease refractive index matching agent between the end faces of the optical fibers has the following problem. Since the refractive index matching agent generally is formed of a silicone or paraffin agent in liquid or grease state, it can enter into the hole portions of the holey fiber with time. Further, this method has the problem that, since the refractive index matching agent generally has a temperature dependency in refractive index, transmission loss of the holey fiber is extremely changed according to a change in refractive index of the refractive index matching agent entered into the hole portion of the holey fiber. Furthermore, this method has the problem that, when the refractive index matching agent enters into the hole portion of the holey fiber, the refractive index matching agent between the end faces of the optical fibers decreases so that air gaps and air bubbles are easily generated between the end faces of the optical fibers to cause the significant lowering of optical characteristics of the holey fiber.

As a measure against this problem, a method may be devised that the hole portions at the end face of the holey fiber are sealed before connecting the holey fiber. However, such a method is not suitable for connecting the optical fibers at the setting site since a dedicated connecting device is needed for performing the method and a lot of time consumption is required for sealing the hole portions at the end face of the holey fiber. Thus, the method is not suitable for connecting the optical fibers at low cost and simply.

Furthermore, the methods of using the film have the following problem. Since the diameter of the optical fiber is as fine as 80 or 125 µm, it is very hard to attach the film onto the end face of the optical fibers at high dimensional accuracy. Further, the film needs to have an adhesive ability or stickiness in order to attach the film onto the end face of the optical fibers. Therefore, when the optical fibers are connected each other at the setting site, a foreign substance such as a dust can easily adhere to the film to reduce reliability of the optical fiber and workability during the connection process of the optical fibers.

In addition, stress (strain) will apply to the resin used as the film when the optical fibers are connected. Since the refractive index of resin generally varies due to the stress applied, variation in transmission characteristics increases due to temperature change when the relaxation of stress is slow.

As an alternative method, fusion splicing may be used for the connection work.

However, since this method needs a fusion splicer, it is not suitable for an optical connector to be used at the setting site simply and for general purposes.

As described above, all the conventional connection methods have the problem in case of using the holey fiber as the external optical fiber or in case of conducting the connection work at the setting site of the optical fiber.

SUMMARY OF THE INVENTION

It is an object of the invention to provide an optical connector that is capable of easy connecting a holey fiber at a setting site thereof.

According to one embodiment of the invention, an optical connector comprising:
  a ferrule;
  an optical fiber connector disposed at an back end of the ferrule;
  an internal optical fiber inserted into the ferrule and the optical fiber connector, the internal optical fiber being adapted to butt-connect at a back end face thereof to an external optical fiber to be inserted into the optical fiber connector; and
  a refractive index matching body attached to the back end face of the internal optical fiber,
  wherein the refractive index matching body comprises a cross-linked and hardened cross-linkable refractive index matching agent including a stress-strain relaxation agent.

In the above embodiment, the following modifications, changes and a combination thereof can be made.

(i) The stress-strain relaxation agent comprises a silicone-based oil or a silicone gel.

(ii) The stress-strain relaxation agent comprises a refractive index in the range of 1.46±0.05.

(iii) The stress-strain relaxation agent is added in the range of 1 to 30% by weight to the cross-linkable refractive index matching agent.

(iv) The refractive-index matching body comprises a refractive index in the range of 1.46±0.05, an optical transmittance of not less than 80%, a breaking elongation of not less than 50%, and a glass adhesive force of not less than 50 g/10 mm width.

(v) The refractive-index matching body comprises a thickness of 5 to 50 μm.

(vi) The refractive-index matching body comprises a spherical surface.

(vii) The refractive-index matching body is attached only to the back end face of the internal optical fiber.

(viii) The refractive-index matching body is attached to the back end face and a side of the internal optical fiber.

(ix) The optical fiber connector comprises a groove that comprises a section area greater than that of the external optical fiber, the groove being adapted to house a part of the external optical fiber.

(x) The groove comprises a V-groove.

(xi) The external optical fiber comprises a holey fiber.

BRIEF DESCRIPTION OF THE DRAWINGS

The preferred embodiments according to the invention will be explained below referring to the drawings, wherein:

FIG. 1 is a longitudinal sectional view showing an optical connector in a preferred embodiment according to the invention;

FIG. 2 is a longitudinal sectional view showing the optical connector in FIG. 1 when an external fiber is connected;

FIG. 3A shows the case that a wedge is not inserted and FIG. 3B shows the case that the wedge is inserted;

DETAILED DESCRIPTION OF THE PREFERRED EMBODIMENTS

Figure 3A:
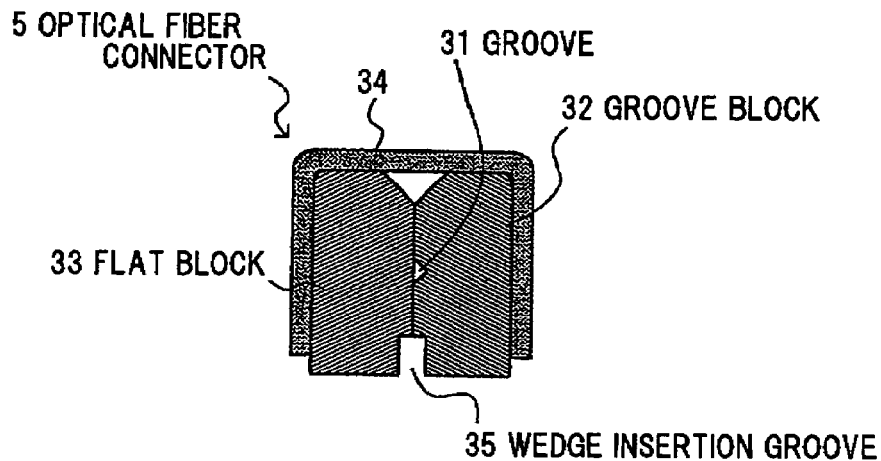
FIGS. 3A and 3B are cross sectional views cut along a line A-A in FIG. 1, where

The preferred embodiments according to the invention will be explained below referring to the drawings.

As shown in FIGS. 1 and 2, an optical connector 1 comprises a ferrule 3 and an optical fiber connector 5 connected to an back end of the ferrule 3. In the optical connector 1, a back end face of an internal optical fiber 2, which is housed within the optical connector 1 from the tip of the ferrule 3 to the optical fiber connector 5, is butt-connected through a refractive-index matching body 6 to another optical fiber (external optical fiber) 4 within the optical fiber connector 5. The refractive-index matching body 6 is formed by cross-linking and hardening a cross-linkable refractive index matching agent with a stress-strain relaxation agent added thereto.

The ferrule 3 houses a front half portion 2a of the internal optical fiber 2. The optical fiber connector 5 is connected to a back end 3a of the ferrule 3 and houses a back half portion 2b of the internal optical fiber 2 and a part of the external optical fiber 4 which are butt-connected therein. The refractive-index matching body 6 formed by cross-linking and hardening the cross-linkable refractive index matching agent with the stress-strain relaxation agent added thereto is attached to a back end face 2c of the internal optical fiber 2.

The external optical fiber 4 is, e.g., a holey fiber and may be an optical fiber without hole portions.

The optical connector 1 is housed within a housing 8 whose profile is indicated by dotted lines in FIGS. 1 and 2. However, the following explanations will be made by omitting the housing 8.

The ferrule 3 is a cylindrical member with a center hole for housing the internal optical fiber 2 and with a flange at the back end 3a.

The optical fiber connector 5 is, as shown in FIG. 3A, composed of a groove block 32 including a plane with a groove 31 and a flat block 33 including a plane without groove, where the planes are butted each other. The outer sides of the groove block 32 and the flat block 33 are clamped by a C-shaped clamp 34 to integrate the blocks. A wedge insertion groove 35 is formed at a mating surface of the blocks 32, 33 where the blocks 32, 33 are not covered with the clamp 34.

The groove 31 houses the back half portion 2b of the internal optical fiber 2 and a part of the external optical fiber 4 (See FIG. 2). The cross-sectional shape of the groove 31 is not specifically limited and is preferably formed to have a section area lager than the external optical fiber 4. The section area of the groove 31 is defined as a cross section of a space formed when the groove block 32 and the flat block 33 are butted together.

In this embodiment, the groove 31 is a V-groove with a groove wall as defined by two slopes with different inclination directions as shown. When the front end face of the external optical fiber 4 is butt-connected to the back end face 2c of the internal optical fiber 2 with the refractive-index matching body 6 attached thereto, a part of the refractive-index matching body 6 not directly contributory to the butt connection can escape into a free space in the V-groove. Thus, since good connection characteristics are obtained by the escape, the groove 31 is preferably formed with the V-groove.

In order to secure the internal optical fiber 2 housed within the V-groove by the flat block 33, it is desirable that a part of the internal optical fiber 2 housed within the V-groove protrudes slightly from the plane of the groove block 32. Here, if the section area of the V-groove is too small, the internal optical fiber 2 will protrude excessively so that a gap may be formed between the groove block 32 and the flat block 33 when being pressed by the flat block 33. On the other hand, if the section area of the V-groove is too large, the internal optical fiber 2 will be entirely housed within the V-groove so that it may not be secured by the flat block 33 since it does not protrude from the plane of the groove block 32. Therefore, it is preferred that the V-groove 31 has a section area greater than that of the external optical fiber 4.

Figure 3B:
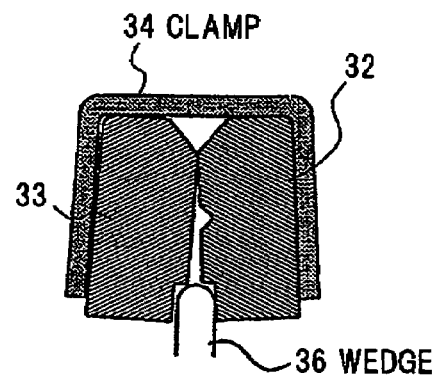

As shown in FIG. 3B, a wedge 36 for the optical fiber connector 5 is a member that has a width greater than that of the wedge insertion groove 35 (See FIG. 3A) when the wedge 36 is not inserted. When the wedge 36 is inserted into the wedge insertion groove 35, a gap is formed between the groove block 32 and the flat block 33 to open the clamp 34 slightly.

Figure 4:
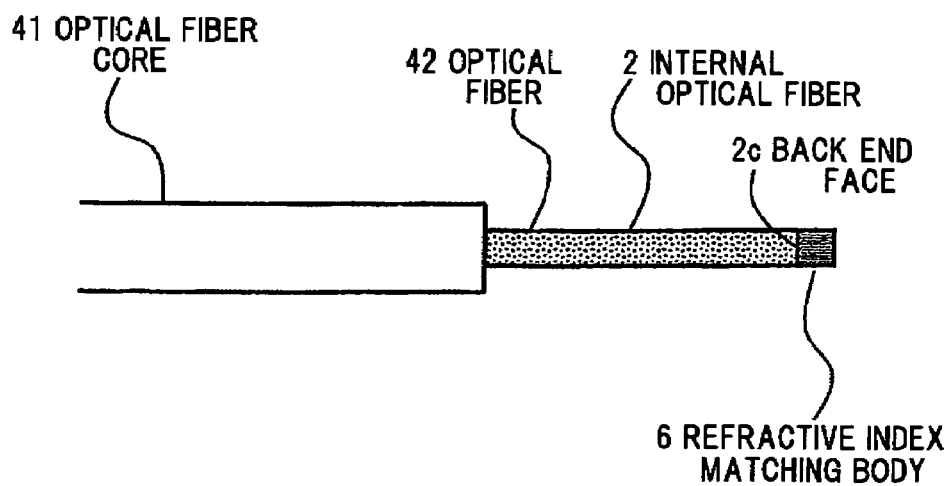
FIG. 4 is a side view showing an internal fiber that is fabricated by a method for processing an end of an optical fiber core conducted to manufacture the internal fiber.

As shown in closeup in FIG. 4, the internal optical fiber 2 is prepared such that an optical fiber 42 obtained by removing the covering of an optical fiber core 41 is cut by a desired length, one end thereof is inserted into the center hole of the ferrule 3, and a front end face 2d thereof (See FIG. 1) is polished with the ferrule 3. Further, to the opposite back end face 2c, the refractive-index matching body 6 is attached.

Figure 5:
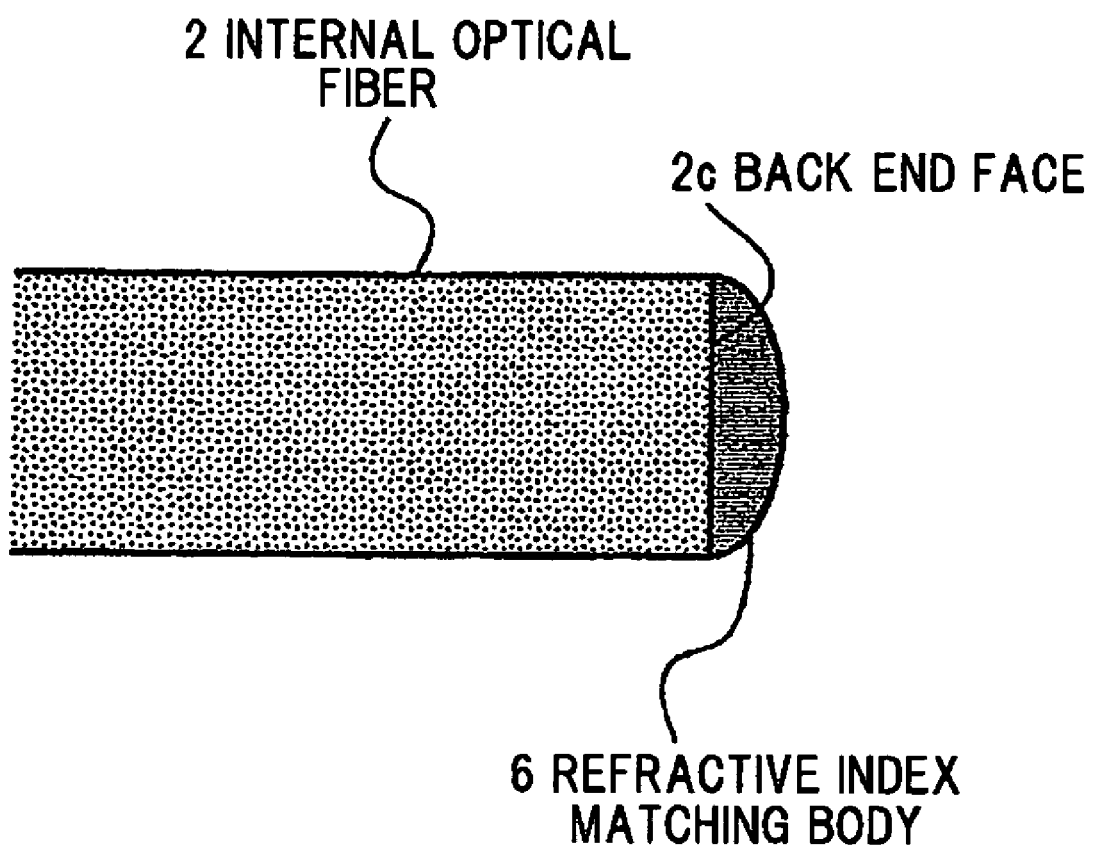
FIG. 5 is an enlarged side view showing a part of the internal fiber in FIG. 4.

As shown in further closeup in FIG. 5, the back end face 2c of the internal optical fiber 2 is kept not polished after the cutting and the refractive-index matching body 6 is attached thereto. The refractive-index matching body 6 is formed such that a cross-linkable refractive index matching agent with a stress-strain relaxation agent added thereto is coated on the back end face 2c of the internal optical fiber 2 and it is cross-linked and hardened.

The refractive-index matching agent is an organic material with a refractive index matching property, where the organic material comprises optical characteristics desired according to need (a refractive index, an optical transmission, etc.) and can be appropriately selected from the group of organic materials such as acrylic-based, epoxy-based, vinyl-based, ethylene-based, silicone-based, urethane-based, polyamide-based, fluorine-based, polybutadiene-based, polycarbonate-based materials, but the material thereof is not limited to the specified materials described above.

Of the refractive index matching agents as described above, the cross-linkable refractive index matching agent is defined as an agent to react to heat and light, humidity, electron beam etc. and to change from a liquid form into a solid form (by cross-linking and hardening). In addition, the cross-linkable refractive index matching agent needs to satisfy that the refractive-index matching body 6 after the cross-liking and hardening has various characteristics necessary for the optical transmission.

The stress-strain relaxation agent is a material added to relax the stress and strain, and it is preferably silicone-based oils, silicone gels etc. The silicone-based oils (or fluids) include straight silicone oils, modified silicone oils, silicone greases and silicone oil compounds. For example, products from Shin-Etsu Chemical Co., Ltd., i.e., KF-50, KF-56, KF-393, KF-101, KF-1002, X-22-3939A, X-22-343, X-22-2000, X-22-2046, X-22-4741 etc., products from GE Toshiba Silicones (Momentive Performance Materials Inc.), i.e., TSF410, TSF411, TSF4420, TSF4421, TSF4440, TSF4445, TSF4446, TSF4450, TSF4452, TSF4460, KF42-334, XF42-A3161, XF-42-B0970, YF3842, TSK5353 etc., and products from Dow Corning Toray Co., Ltd., i.e., BY16-837, BY16-839, BY16-891, BY16-845, BY16-874, SF8416, SF8421, SF8422, SF8427, SH3746, SH3749, SH3771, SH3711, SH8700, SH203, SH230 etc. Of these stress-strain relaxation agents, one may be used or more than two may be combined in use.

The silicone gels are gels with a three-dimensional cross linkage or with a noncovalently-bonded and physical cross linkage. For example, products from Shin-Etsu Chemical Co., Ltd., i.e., LPS-1000, KSG-15, KSG-16, KSG-18, KSG-21 etc. and fluorine-modified silicone gels from KOSÉ Corporation.

The refractive index of the stress-strain relaxation agent is preferably in the range of 1.46±0.05. If the refractive index thereof is out of the range of 1.46±0.05, connection loss increases and return loss lowers extremely.

The stress-strain relaxation agent is preferably 1 to 30% by weight added to the cross-linkable refractive index matching agent. If the addition amount thereof is less than 1% by weight, the effect of the addition thereof cannot be obtained. If more than 30% by weight, the refractive-index matching body 6 is more likely to peel or remove from the internal optical fiber 2 when detaching the external optical fiber 4.

The refractive index of the refractive-index matching body 6 is preferably in the range of 1.46±0.05. If the refractive index thereof is out of the range of 1.46±0.05, connection loss increases and return loss lowers extremely. Further, the refractive index of the refractive-index matching body 6 is more preferably in the range of 1.46±0.01.

The rate of change in refractive index to temperature of the refractive-index matching body 6 is preferably in the range of ±2% at −40 to 70° C.

The optical transmittance of the refractive-index matching body 6 is preferably not less than 80%. If the optical transmittance is less than 80%, connection loss at a connection position to the external optical fiber 4 exceeds 1 dB. Further, the optical transmittance of the refractive-index matching body 6 is more preferably not less than 90%.

The breaking elongation of the refractive-index matching body 6 is preferably not less than 50%. If the breaking elongation thereof is less than 50%, when the refractive-index matching body 6 may be deformed by pressing during the connection work, split or collapse is likely to be generated in the refractive-index matching body 6. Further, the breaking elongation of the refractive-index matching body 6 is more preferably not less than 100%.

Here, "breaking elongation" of the refractive-index matching body 6 is defined as an elongation percentage when a test film prepared using the material of the body 6 as below is broken by pulling the test film at a pull speed of 50 mm/min. The test film (strip) is prepared such that a 100 to 200 μm thick film layer composed of a stress-strain relaxation agent-added cross-linkable refractive index matching agent is formed on a silica slide glass plate, the agent is hardened to form a film as a refractive-index matching body, and the film is shaped into a 10 mm wide strip.

The glass adhesive force of the refractive-index matching body 6 is preferably not less than 50 g/10 mm width. If the glass adhesive force thereof is less than 50 g/10 mm width, when the external optical fiber 4 is repeatedly attached to or detached from the optical connector 1, the refractive-index matching body 6 is likely to remove from the internal optical fiber 2.

The glass adhesive force at the surface of the refractive-index matching body 6 is preferably smaller than that at the back end face 2c of the internal optical fiber 2. If the glass adhesive force of at the surface of the refractive-index matching body 6 is equal to or larger than that at the back end face 2c of the internal optical fiber 2, when the external optical fiber 4 is repeatedly detached from the optical connector 1, the refractive-index matching body 6 is like to peel from the internal optical fiber 2 and attach to the external optical fiber 4.

Here, "glass adhesive force" of the refractive-index matching body 6 is defined as a load (g) required when a test film prepared using the material of the body 6 as below is peeled from a silica slide glass plate at 90 degrees angle to the silica slide glass plate and at a peeling speed of 50 mm/min according to "90-degrees peeling method" of JIS Z0237. The test film (strip) is prepared such that a 100 μm thick film layer composed of a stress-strain relaxation agent -added cross-linkable refractive index matching agent is formed on the silica slide glass plate, the agent is hardened to form a film as a refractive-index matching body, and the film is shaped into a 10 mm wide strip.

The thickness of the refractive-index matching body 6 is preferably in the range of 5 to 50 μm. If the thickness thereof is less than 5 μm, the volume of the refractive-index matching body 6 is insufficient so that it is difficult to obtain a sufficient refractive-index matching property, and the internal optical fiber 2 and the external optical fiber 4 are likely to directly contact each other so that a scratch can be generated on the end face of the optical fibers. On the other hand, if the thickness thereof is more than 50 μm, the end-face distance between the internal optical fiber 2 and the external optical fiber 4 is likely to widen so that the influence of expansion and shrinkage due to axis misalignment and temperature change may increase. The thickness of the refractive-index matching body 6 is more preferably 10 to 40 μm, and still more preferably 15 to 30 μm.

Here, "thickness" of the refractive-index matching body 6 is defined as a thickness that the refractive-index matching body 6 attached to the back end face 2c of the internal optical fiber 2 with a spherical shape has a maximum thickness from the back end face 2c of the internal optical fiber 2.

The procedures for connecting the optical connector 1 of the invention to the external optical fiber 4 at a setting site will be describe below.

First, as shown in FIG. 1, the optical connector 1 is provided to which the external optical fiber 4 is not yet connected. In the front half portion of the optical fiber connector 5, the back half portion 2b of the internal optical fiber 2 is already housed in the groove 31. Here, the internal optical fiber 2 is inserted between the groove block 32 and the flat block 33, and the outside of the groove block 32 and the flat block 33 is clamped by the clamp 34 to integrate the optical fiber connector 5. If the clamp 34 is removed to allow the opening and closing of the groove block 32 and the flat block 33, the internal optical fiber 2 will be out of alignment. Thus, in order to keep the alignment, the clamp 34 is not removed.

As shown in FIG. 3B, the wedge 36 is inserted into the wedge groove 35 to make a gap between the groove block 32 and the flat block 33.

The external optical fiber 4 is cut by a certain length, and, without polishing the end surface, the external optical fiber 4 is inserted into the groove 31 on the back end portion of the optical fiber connector 5 by using the gap and is guided forward. When the front end face of the external optical fiber 4 contacts the refractive-index matching body 6 attached to the back end face 2c of the internal optical fiber 2, the guiding is stopped.

By removing the wedge 36 from the wedge groove 35, the internal optical fiber 2 and the external optical fiber 4 are clamped together between the groove block 32 and the flat block 33 so that they are integrated with the optical fiber connector 5. Since the external optical fiber 4 is subjected to the side pressure from the groove block 32 and the flat block 33 by the spring force of the clamp 34, it can prevent from escaping from optical fiber connector 5. Thus, the connection procedures are completed.

The effects of the optical connector 1 of this embodiment will be described below.

In this embodiment, the refractive-index matching body 6 is attached to the back end face 2c of the internal optical fiber 2, where the cross-linkable refractive index matching agent with the stress-strain relaxation agent added thereto is cross-linked and hardened to yield the refractive-index matching body 6. Therefore, when conducting the connecting of the external optical fiber 4 to the optical connector 1 at the setting site of the optical fiber (i.e., external optical fiber 4), the external optical fiber 4 can be connected to the optical connector 1 without the polishing of the external optical fiber 4 after being cut.

Further, since the refractive-index matching body 6 includes the stress-strain relaxation agent, the optical connector 1 is less subject to the variation with time caused by the temperature dependency.

In this embodiment, the refractive-index matching body 6 is set to have a glass adhesive force of not less than 50 g/10 mm width. Therefore, the refractive-index matching body 6 has a sufficient adhesiveness to glass, where even when the external optical fiber 4 is repeatedly detached, the refractive-index matching body 6 will be very little peeled off to increase the connection loss.

Further, since the refractive-index matching body 6 includes the stress-strain relaxation agent, the stress and strain caused by the deformation of the refractive-index matching body 6 can be relaxed when the external optical fiber 4 contacts the refractive-index matching body 6. Therefore, change in refractive index caused by the stress and stress of the refractive-index matching body 6 can be suppressed. Further, since the relaxation of the stress and strain of the refractive-index matching body 6 is enhanced, the connection characteristics of the connection portion between the internal optical fiber 2 and the external optical fiber 4 can be stabilized.

The refractive-index matching body 6 has a refractive index in the range of 1.46±0.05, a optical transmittance of not less than 80%, a breaking elongation of not less than 50%, and a glass adhesive force of not less than 50 g/10 mm width. Thereby, the connection loss of the connection portion between the internal optical fiber 2 and the external optical fiber 4 can be reduced, and the peeling or breaking of the refractive-index matching body 6 can be prevented.

Figure 7:
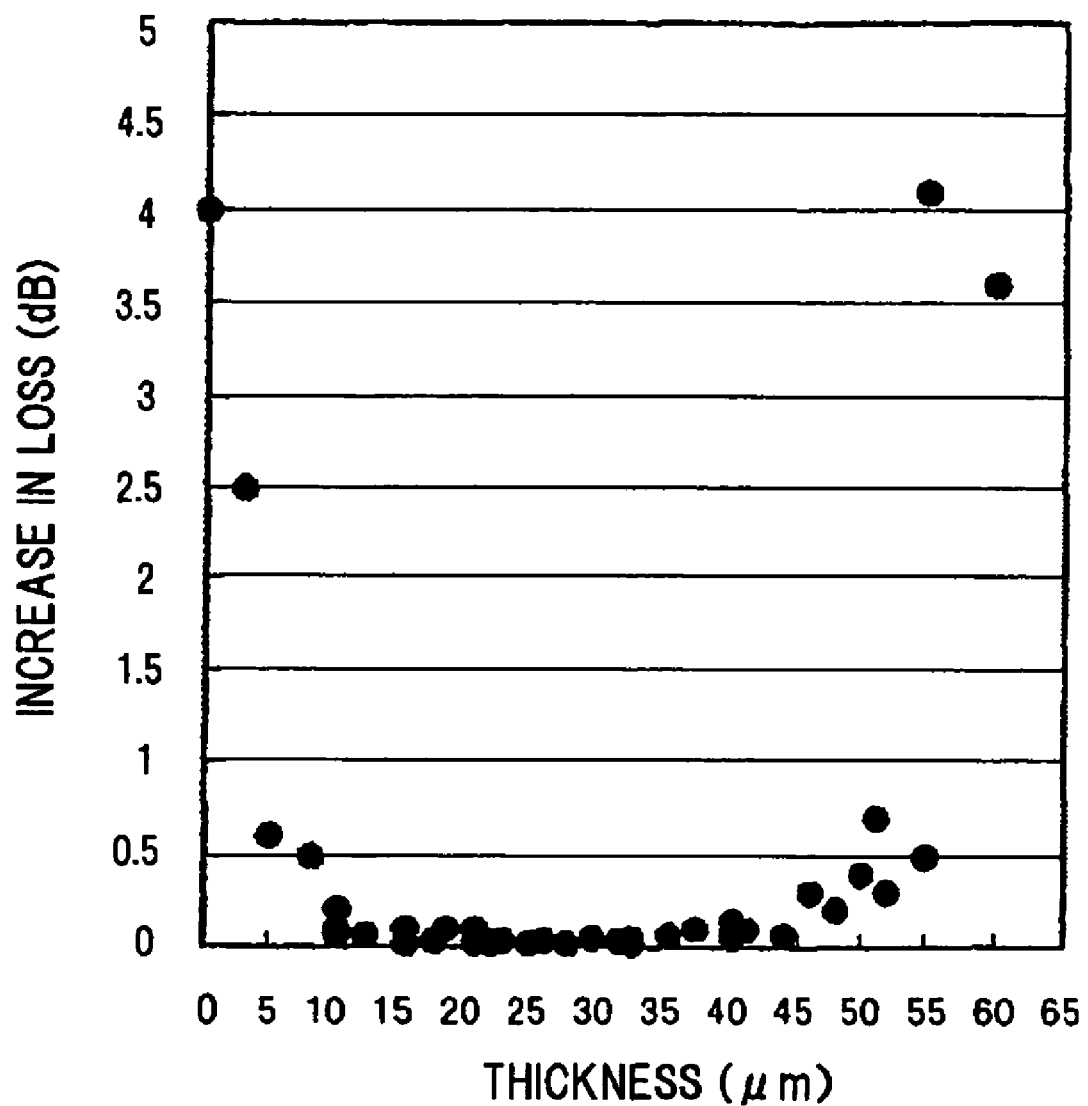
FIG. 7 is a graph showing the relationship between the thickness of a refractive-index matching agent and the increase of loss.

In this embodiment, since the thickness of the refractive-index matching body 6 is in the range of 5 to 50 μm, increase in connection loss can be reduced. Here, various optical connectors different in thickness of the refractive-index matching body 6 are produced and tested for a temperature cycle test (−40 to 70° C./6 h×10 cycles), where transmission losses before and after the test are compared. As shown in FIG. 7, if the thickness (on the horizontal axis) of the refractive-index matching body 6 is less than 10 μm, increase in connection loss (on the vertical axis) is a little more than that in case of not less than 10 μm. If less than 5 μm, increase in connection loss becomes significant. On the other hand, if the thickness (on the horizontal axis) of the refractive-index matching body 6 is more than 35 μm, increase in connection loss is a little more than that in case of not more than 35 μm. If less than 50 μm, increase in connection loss becomes significant. Thus, the thickness of the refractive-index matching body 6 is preferably in the range of 5 to 50 μm since the increase in connection loss can be suppressed.

Other preferred embodiments of the invention will be described below.

As shown in FIG. 5, the refractive-index matching body 6 has preferably a spherical surface. Herein, "spherical" includes a variety of rounded shapes. The refractive-index matching body 6 is attached only to the back end face 2c of the internal optical fiber 2 and entire surface of the back and face 2c is covered with the refractive-index matching body 6.

(First effect of the embodiment) In the embodiment as shown in FIG. 5, since the refractive-index matching body 6 has the spherical surface, the refractive-index matching body 6 can be easy deformed when the front end face of the external optical fiber 4 guided forward in the groove 31 on the back half portion of the optical fiber connector 5 contacts the refractive-index matching body 6, as compared to the case that the refractive-index matching body 6 has a flat surface like a conventional one.

(Second effect of the embodiment) If the refractive-index matching body 6 has the flat surface like a conventional one, an air layer may be left between the external optical fiber 4 and the front end face of the external optical fiber 4 when the front end face of the external optical fiber 4 contacts the refractive-index matching body 6. This phenomenon is caused when the front end face of the external optical fiber 4 is cut orthogonally to the axis thereof. In contrast to this, in this embodiment, since the refractive-index matching body 6 has the spherical surface, it begins to contact the external optical fiber 4 at a center portion thereof so that the air layer can be prevented from being left between the external optical fiber 4 and the front end face of the external optical fiber 4.

(Third effect of the embodiment) On the other hand, if the front end face of the external optical fiber 4 is cut diagonally to the axis thereof, when the front end face of the external optical fiber 4 contacts the refractive-index matching body 6, the external optical fiber 4 may be pushed back by the spring force of the refractive-index matching body 6 with the flat surface like a conventional one, so that the core of the external optical fiber 4 may fail to contact the refractive-index matching body 6. In contrast to this, in this embodiment, since the refractive-index matching body 6 has the spherical surface, it begins to contact the external optical fiber 4 at a center portion thereof so that the core of the external optical fiber 4 can surely contact the refractive-index matching body 6.

(Fourth effect of the embodiment) In this embodiment, the refractive-index matching body 6 is attached only to the back end face 2c of the internal optical fiber 2 and not attached to the side of the internal optical fiber 2. If the refractive-index matching body 6 is attached to the side of the internal optical fiber 2, the axis of the internal optical fiber 2 may be shifted from a proper position at which it must be placed when the back half portion 2b of the internal optical fiber 2 is housed in the groove 31. In contrast to this, in this embodiment, since the refractive-index matching body 6 is attached only to the back end face 2c of the internal optical fiber 2, the shifting of the axis can be prevented.

The refractive-index matching body 6 may have shapes as shown in FIGS. 6A to 6D.

(Fifth effect of the embodiment) In this embodiment, the refractive-index matching body 6 is attached only to the back end face 2c of the internal optical fiber 2, the internal optical fiber 2 and the external optical fiber 4 can be smoothly housed in the groove 31 of the optical fiber connector 5.

(Sixth effect of the embodiment) In this embodiment, the refractive-index matching body 6 is attached only to the back end face 2c of the internal optical fiber 2, the refractive-index matching body 6 can be prevented from splitting when the back half portion 2b of the internal optical fiber 2 is clamped and pressed between the groove block 32 and the flat block 33.

A method for attaching the refractive-index matching body 6 only to the back end face 2c of the internal optical fiber 2 is conducted such that the side of the internal optical fiber 2 is water repellent-finished so that the cross-linkable refractive index matching agent including the stress-strain relaxation agent is not stuck to the side of the internal optical fiber 2 when coating the back end face 2c of the internal optical fiber 2 with the cross-linkable refractive index matching agent including the stress-strain relaxation agent. Although the cross-linkable refractive index matching agent including the stress-strain relaxation agent is not water-soluble, the water repellent-finished side of the internal optical fiber 2 can repel the cross-linkable refractive index matching agent including the stress-strain relaxation agent.

Figure 6A:
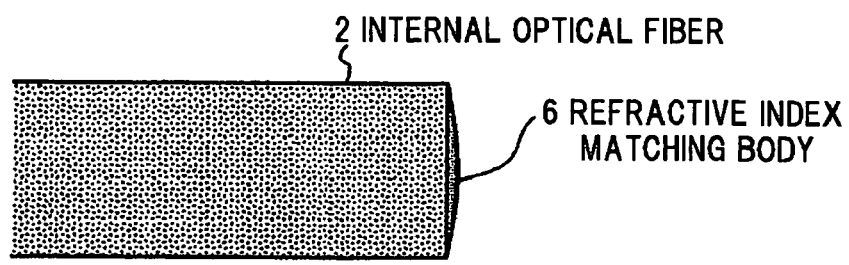
FIGS. 6A to 6E are enlarged side views showing a part of an internal fiber in other preferred embodiments according to the invention.
Figure 6B:
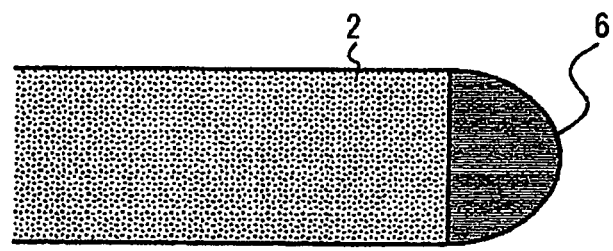
Figure 6C:
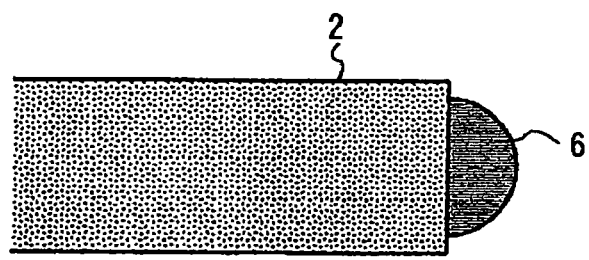
Figure 6D:
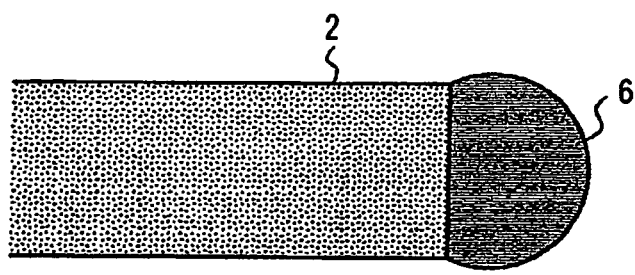
Figure 6E:
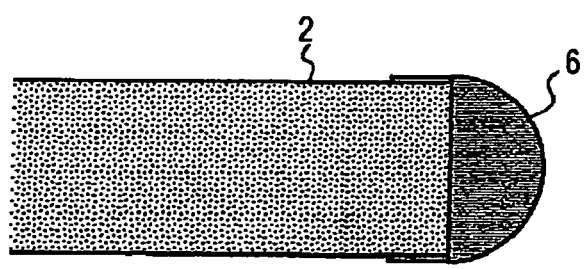

A further embodiment is as shown in FIG. 6E, where the refractive-index matching body 6 is attached to the back end face 2c and the side of the internal optical fiber 2. Thereby, another effect can be obtained that the refractive-index matching body 6 is less subject to peeling. The amount (or thickness) of the refractive-index matching body 6 attached to the side is controlled to be a little.

EXAMPLES

Example 1

As the cross-linkable refractive index matching agent, 50% ethyl acetate solution of acrylic resin is used that includes n-butyl acrylate/methyl acrylate/acrylic acid/2-hydroxyethyl methacrylate copolymer (compounding ratio=82/15/2.7/0.3 parts by weight).

As the stress-strain relaxation agent, a silicone oil (TSK5353: available from GE Toshiba Silicones (Momentive Performance Materials Inc.)) is used.

To 100 parts by weight of the cross-linkable refractive index matching agent, 2 parts by weight of the stress-strain relaxation agent and 1.0 part by weight of cross-linking agent (product name: CORONATE®, available from Nippon Polyurethane Industry Co., Ltd.) are added and mixed. The mixed acrylic adhesive agent coating solution (or stress-strain relaxation agent-added cross-linkable refractive index matching agent) is solely cross-linked and hardened to have a refractive-index matching body sample.

With regard to the refractive-index matching body sample, an optical transmittance thereof is measured 93 to 95% by a spectrophotometer in the wavelength range of 1300 to 1600 nm. Further, a refractive index thereof is measured in the range of 1.465±0.005 by an Abbe refractometer at room temperature (23±2° C.). A breaking elongation thereof is measured in the range of 200 to 300%. A glass adhesive force thereof is measured in the range of 400 to 800 g/10 mm width.

Then, the optical connector 1 as shown in FIG. 1 is produced by using the above stress-strain relaxation agent-added cross-linkable refractive index matching agent.

optical fiber 4 exposed by removing the covering layer is cleaned by alcohol, and then the external optical fiber 4 is cut by a fiber cutter at a right angle (angular error: 1 degree or less) to form a front end face thereof.

Then, the external optical fiber 4 is connected to the optical connector 1 as described in the embodiment, and is analyzed with the following tests and measurements whose results (Example 1) are shown in Table 1 as below.

TABLE 1

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| (1) Room temperature (initial) | Connection loss (dB) | 0.1 to 0.4 | 0.1 to 0.4 | 0.2 to 0.4 | 0.2 to 0.5 | 0.1 to 0.4 | 0.1 to 0.4 | 0.1 to 0.4 | 0.2 to 0.6 |
| | Return loss (dB) | −60 to −45 | −60 to −45 | −55 to −45 | −55 to −45 | −55 to −45 | −60 to −45 | −60 to −45 | −55 to −40 |
| (2) Room temperature (after 24 hours) | Increase in loss (dB) | 0.00 to 0.02 | 0.00 to 0.02 | 0.00 to 0.03 | 0.00 to 0.03 | 1 or more | 0.00 to 0.02 | 0.00 to 0.02 | 0.01 to 0.03 |
| (3) Room temperature | Return loss stabilizing time (h) | less than 1 | less than 1 | less than 1 | less than 1 | — | 2 to 3 | 2 to 3 | less than 1 |
| (4) Increase in loss (dB) in continuous temperature and humidity cycle test | | less than 0.3 | less than 0.3 | less than 0.3 | less than 0.3 | 1 or more | less than 0.3 | less than 0.3 | less than 0.3 |
| (5) Increase in loss (dB) in temperature cycle test | | less than 0.3 | less than 0.3 | less than 0.3 | less than 0.3 | 1 or more | less than 0.3 | less than 0.3 | less than 0.3 |
| (6) Increase in loss (dB) in tempurature and humidity cycle test | | less than 0.3 | less than 0.3 | less than 0.3 | less than 0.3 | 1 or more | less than 0.3 | less than 0.3 | less than 0.3 |
| (7) Increase in loss (dB) in low temperature test | | less than 0.3 | less than 0.3 | less than 0.3 | less than 0.3 | 1 or more | less than 0.3 | less than 0.3 | less than 0.3 |
| (8) Peeling of matching body during repeated connections | | No | No | No | No | — | No | No | Yes |

Measurement wavelength = 1550 nm,
Light source: Light Emitting Diode (LED)

First, as shown in FIG. 4, the covering layer of the optical fiber core 41 manufactured by Hitachi Cable Ltd. and marketed under a trade name of "BBG-SM-WF" (with an outer core diameter of about 250 μm and a fiber diameter of 125±1 μm) is removed by 200 mm length, the surface of the optical fiber 42 exposed by removing the covering layer is cleaned by alcohol, and then the optical fiber 42 is cut by a fiber cutter at a right angle (angular error: 1 degree or less) to form an end face as the back end face 2c.

Then, the stress-strain relaxation agent-added cross-linkable refractive index matching agent is attached to the end face of the optical fiber 42 by potting. Then, it is cross-linked and hardened by being left at room temperature to form the refractive index matching member 6 as shown in FIG. 5. The thickness of the refractive index matching member 6 is set to be 20 to 25 μm.

Then, the optical fiber 42 is cut off from the optical fiber core 41 to have the optical fiber 42 with the refractive-index matching body 6, and the optical fiber 42 with the refractive-index matching body 6 is inserted into the ferrule 3 of the optical connector 1 to be installed as the internal optical fiber 2. Then, the optical fiber 42 is cut at the front end of the ferrule 3, and the front end face 2d thereof is polished to complete the optical connector 1. Ten of the optical connectors 1 thus composed are produced.

As the external optical fiber 4, the one-side covering layer of a holey fiber manufactured by Hitachi Cable Ltd. and marketed under a trade name of "BBG-HF" (with an outer core diameter of about 250 μm and a fiber diameter of 125±1 μm) is removed by a certain length, the surface of the external The details of the above tests (1) to (8) in Table 1 are as follows.

(1) Connection loss (dB) and return loss (dB) just after the external optical fiber 4 is connected to the optical connector 1.

(2) Increase in loss (dB) after the external optical fiber 4 is connected to the optical connector 1 at room temperature (23±2° C.) for 24 hours.

(3) Time (h) required for stabilizing the return loss.

Figure 8:
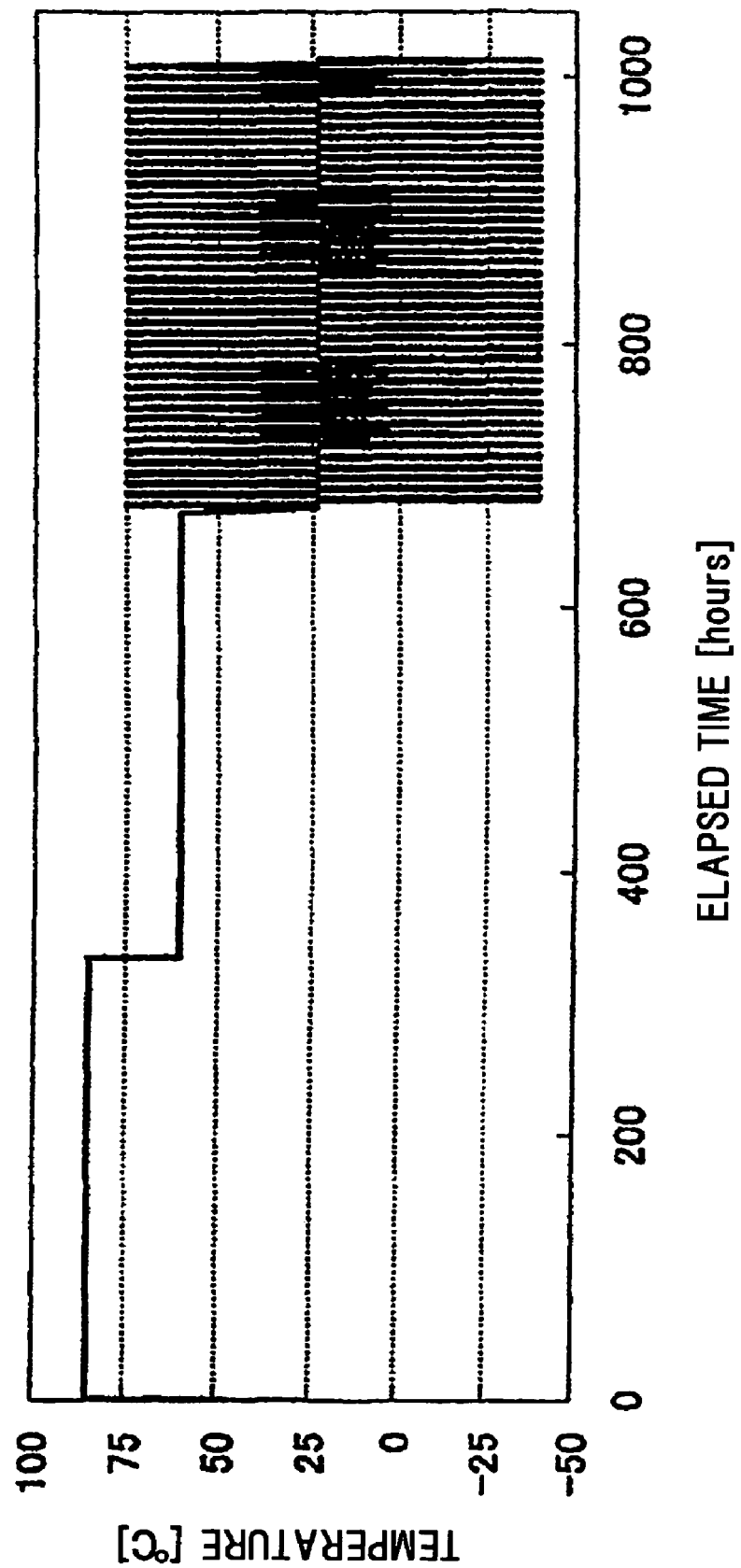
FIG. 8 is a graph showing a relation between a temperature and an elapsed time in a continuous temperature and humidity cycle test conducted by using an optical connector in Examples according to the invention and an optical connector in Comparative Examples.

(4) Increase in loss (dB) after the continuous temperature and humidity cycle test ((temperature at 85° C.×336 hours, temperature at 60° C.×humidity at 95%×336 hours, and temperature at −40 to 70° C./8 hours)×42 cycles) as shown in FIG. 8.

Figure 9:
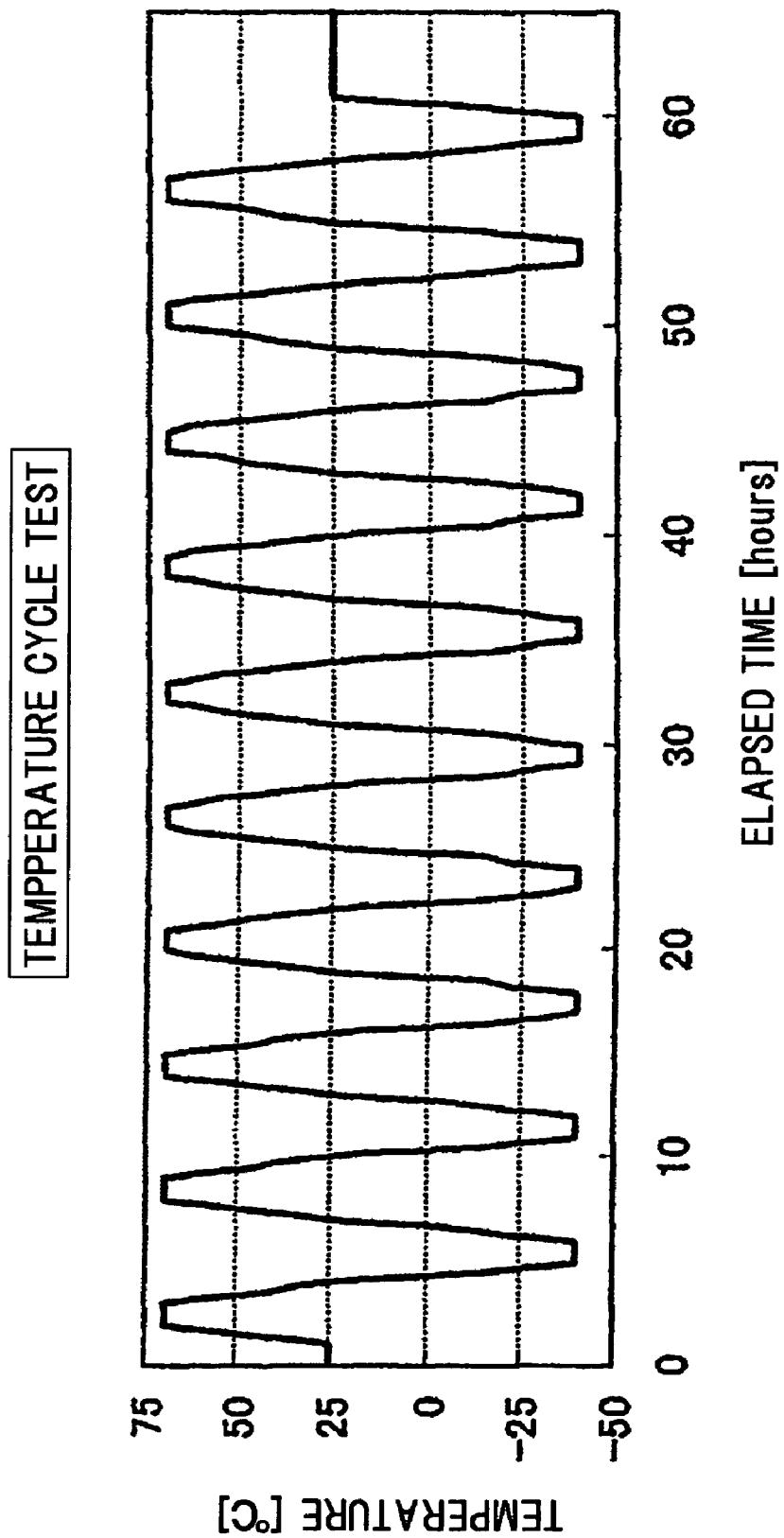
FIG. 9 is a graph showing a relation between a temperature and an elapsed time in a temperature cycle test conducted by using an optical connector in Examples according to the invention and an optical connector in Comparative Examples.

(5) Increase in loss (dB) after the temperature cycle test (temperature at −40 to 70° C./6 hours×10 cycles) as shown in FIG. 9.

Figure 10:
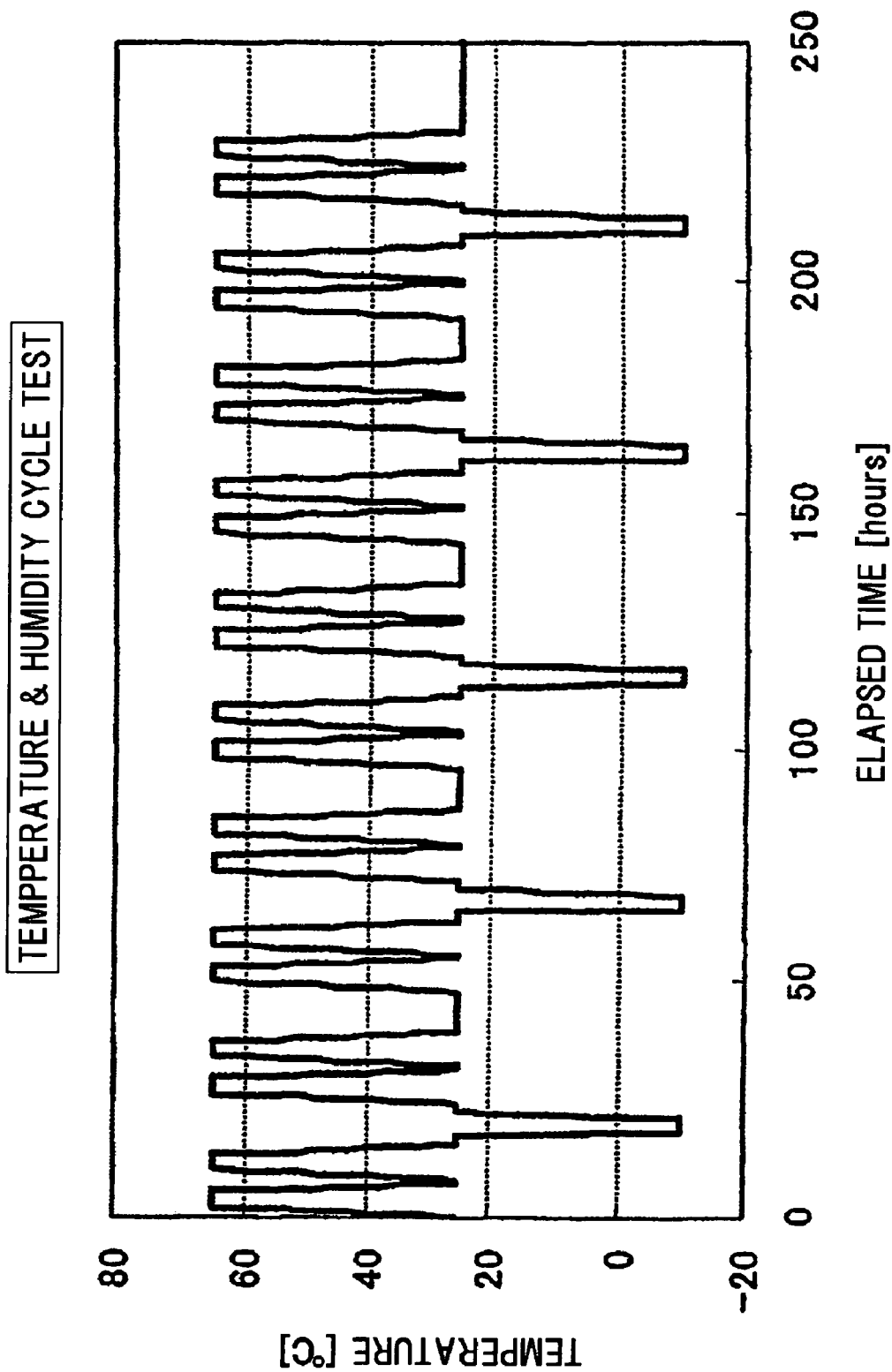
FIG. 10 is a graph showing a relation between a temperature and an elapsed time in a temperature and humidity cycle test conducted by using an optical connector in Examples according to the invention and an optical connector in Comparative Examples.

(6) Increase in loss (dB) after the temperature and humidity cycle test ((temperature at 25° C.×humidity at 93%, temperature at 65° C.×humidity at 93%, temperature at 25° C.×humidity at 93%, temperature at 65° C.×humidity at 93%, temperature at 25° C.×humidity at 93%, temperature at −10 to 25° C.×humidity at 93%, temperature at 65° C.×humidity at 93%, temperature at 25° C.×humidity at 93%, temperature at 65° C.×humidity at 93%, and temperature at 25° C.×humidity at 93%)×5cycles) as shown in FIG. 10.

Figure 11:
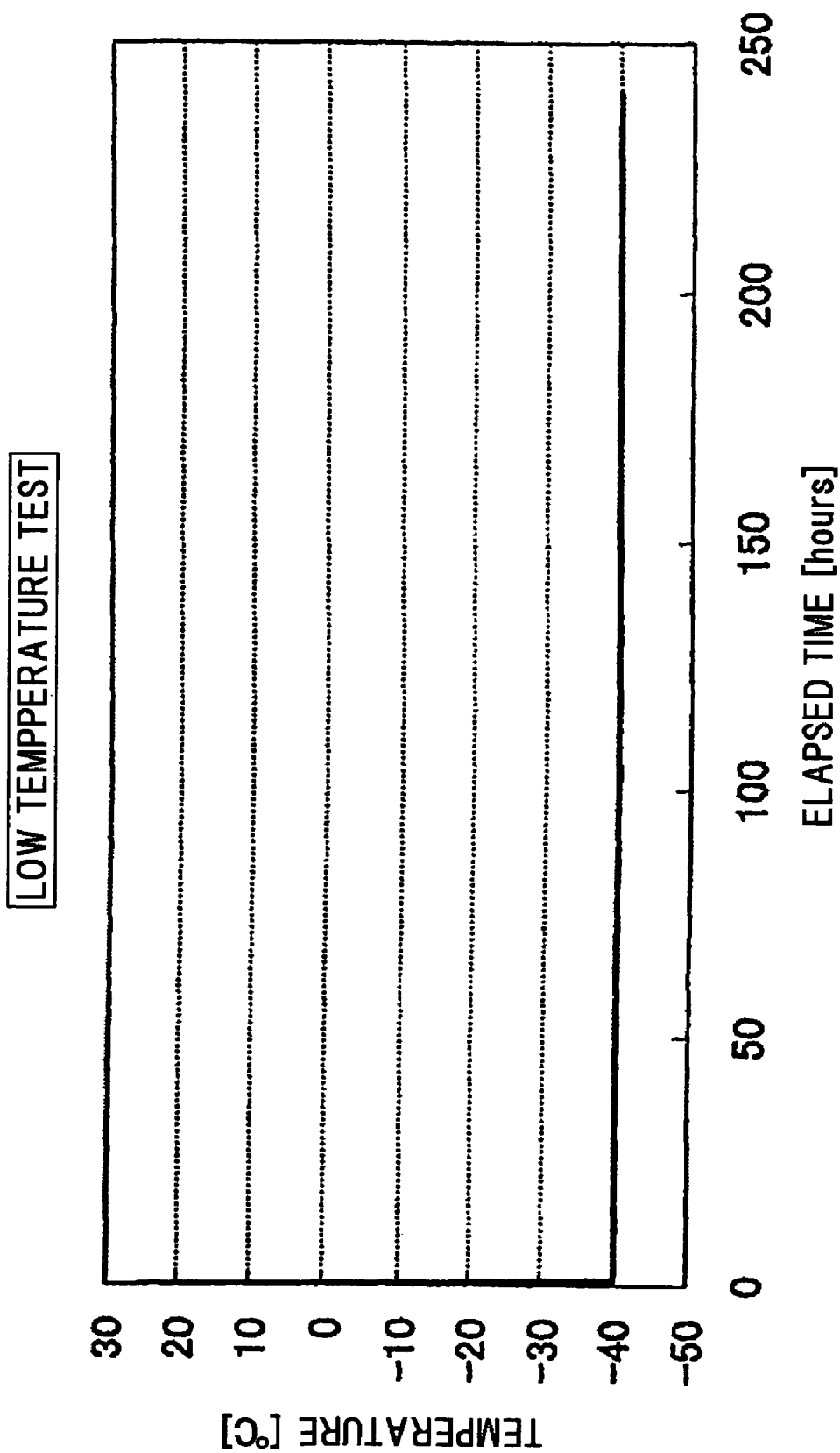
FIG. 11 is a graph showing a relation between a temperature and an elapsed time in a low temperature test conducted by using an optical connector in Examples according to the invention and an optical connector in Comparative Examples.

(7) Increase in loss (dB) after the low temperature test (temperature at −40×240 hours) as shown in FIG. 11.

(8) Occurrence of the peeling of the refractive-index matching body 6 during the external optical fiber 4 is repeatedly connected 10 times after the respective measurements.

In the above test (4), five pieces of the optical connectors 1 of ten pieces prepared are used. The remaining 5 pieces of the optical connectors 1 are used for the above tests (5) to (7).

Example 2

As the cross-linkable refractive index matching agent, 50% ethyl acetate solution of acrylic resin is used that includes n-butyl acrylate/methyl acrylate/acrylic acid/2-hydroxyethyl methacrylate copolymer (compounding ratio =82/15/2.7/0.3 parts by weight).

As the stress-strain relaxation agent, a silicone oil (TSK5353: available from GE Toshiba Silicones (Momentive Performance Materials Inc.)) is used.

To 100 parts by weight of the cross-linkable refractive index matching agent, 5 parts by weight of the stress-strain relaxation agent and 1.0 part by weight of cross-linking agent (product name: CORONATE®, available from Nippon Polyurethane Industry Co., Ltd.) are added and mixed. The mixed acrylic adhesive agent coating solution (or stress-strain relaxation agent-added cross-linkable refractive index matching agent) is solely cross-linked and hardened to have a refractive-index matching body sample.

With regard to the refractive-index matching body sample, an optical transmittance thereof is measured 93 to 95% by a spectrophotometer in the wavelength range of 1300 to 1600 nm. Further, a refractive index thereof is measured in the range of 1.465±0.005 by an Abbe refractometer at room temperature (23±2° C.). A breaking elongation thereof is measured in the range of 200 to 300%. A glass adhesive force thereof is measured in the range of 300 to 700 g/10 mm width.

Then, the optical connector 1 as shown in FIG. 1 is produced by using the above stress-strain relaxation agent-added cross-linkable refractive index matching agent. The production method thereof is the same as Example 1, and ten of the optical connectors 1 are produced thereby. Then, as in Example 1, the external optical fiber 4 is connected to the optical connector 1 and is analyzed with the same tests and measurements whose results (Example 2) are shown in Table 1 as above.

Example 3

As the cross-linkable refractive index matching agent, 50% ethyl acetate solution of acrylic resin is used that includes n-butyl acrylate/methyl acrylate/acrylic acid/2-hydroxyethyl methacrylate copolymer (compounding ratio=82/15/2.7/0.3 parts by weight).

As the stress-strain relaxation agent, a silicone oil (TSK5353: available from GE Toshiba Silicones (Momentive Performance Materials Inc.)) is used.

To 100 parts by weight of the cross-linkable refractive index matching agent, 25 parts by weight of the stress-strain relaxation agent and 1.0 part by weight of cross-linking agent (product name: CORONATE®, available from Nippon Polyurethane Industry Co., Ltd.) are added and mixed. The mixed acrylic adhesive agent coating solution (or stress-strain relaxation agent-added cross-linkable refractive index matching agent) is solely cross-linked and hardened to have a refractive-index matching body sample.

With regard to the refractive-index matching body sample, an optical transmittance thereof is measured 93 to 95% by a spectrophotometer in the wavelength range of 1300 to 1600 nm. Further, a refractive index thereof is measured in the range of 1.465±0.005 by an Abbe refractometer at room temperature (23±2° C.). A breaking elongation thereof is measured in the range of 200 to 300%. A glass adhesive force thereof is measured in the range of 100 to 300 g/10 mm width.

Then, the optical connector 1 as shown in FIG. 1 is produced by using the above stress-strain relaxation agent-added cross-linkable refractive index matching agent. The production method thereof is the same as Example 1, and ten of the optical connectors 1, are produced thereby. Then, as in Example 1, the external optical fiber 4 is connected to the optical connector 1 and is analyzed with the same tests and measurements whose results (Example 3) are shown in Table 1 as above.

Example 4

As the cross-linkable refractive index matching agent, addition silicone-based adhesive agent coating solution is used that includes SD4590/BY24-741/SRX212/toluene (compounding ratio=100/1.0/0.9/50 parts by weight, all available from Dow Coming Toray Co., Ltd.).

As the stress-strain relaxation agent, a silicone gel (KSG-15: available from Shin-Etsu Chemical Co., Ltd.) is used.

To 100 parts by weight of the cross-linkable refractive index matching agent, 25 parts by weight of the stress-strain relaxation agent is added and mixed. The mixed coating solution (or stress-strain relaxation agent-added cross-linkable refractive index matching agent) is solely cross-linked and hardened to have a refractive-index matching body sample.

With regard to the refractive-index matching body sample, an optical transmittance thereof is measured 92 to 94% by a spectrophotometer in the wavelength range of 1300 to 1600 nm. Further, a refractive index thereof is measured in the range of 1.465±0.005 by an Abbe refractometer at room temperature (23±2° C.). A breaking elongation thereof is measured in the range of 150 to 300%. A glass adhesive force thereof is measured in the range of 200 to 800 g/10 mm width.

Then, the optical connector 1 as shown in FIG. 1 is produced by using the above stress-strain relaxation agent-added cross-linkable refractive index matching agent. The production method thereof is the same as Example 1, and ten of the optical connectors 1 are produced thereby. Then, as in Example 1, the external optical fiber 4 is connected to the optical connector 1 and is analyzed with the same tests and measurements whose results (Example 4) are shown in Table 1 as above.

Comparative Example 1

As a non-cross-linking refractive index matching agent, OC-431A-LVP (with a refractive index of 1.46, manufactured by Nye Lubricants Inc.) is used.

By using the non-cross-linking refractive index matching agent, an optical connector is produced as shown in FIG. 1.

As shown in FIG. 4, as shown in FIG. 4, the covering layer of an optical fiber core manufactured by Hitachi Cable Ltd. and marketed under a trade name of "BBG-SM-WF" (with an outer core diameter of about 250 µm and a fiber diameter of 125±1 µm) is removed by 200 mm length, the surface of the optical fiber exposed by removing the covering layer is cleaned by alcohol, and then the optical fiber is cut by a fiber cutter at a right angle (angular error: 1 degree or less) to form an end face as the back end face.

Then, the optical fiber is cut off from the optical fiber core, and the cut optical fiber is inserted into the ferrule of the optical connector to be installed as the internal optical fiber. Then, the internal optical fiber is cut at the front end of the ferrule, and the front end face thereof is polished together with the ferrule.

The non-cross-linking refractive index matching agent is attached to the back end face of the internal optical fiber. Ten of the optical connectors thus composed are produced. As in Examples 1 to 4, the external optical fiber is connected to the optical connector and is analyzed with the same tests and measurements whose results (Comparative Example 1) are shown in Table 1 as above.

Comparative Example 2

As the cross-linkable refractive index matching agent, 50% ethyl acetate solution of acrylic resin is used that includes n-butyl acrylate/methyl acrylate/acrylic acid/2-hydroxyethyl methacrylate copolymer (compounding ratio=82/15/2.7/0.3 parts by weight).

To 100 parts by weight of the cross-linkable refractive index matching agent, 1.0 part by weight of cross-linking agent (product name: CORONATE®, available from Nippon Polyurethane Industry Co., Ltd.) is added and mixed. The mixed acrylic adhesive agent coating solution (or no stress-strain relaxation agent-added cross-linkable refractive index matching agent) is solely cross-linked and hardened to have a refractive-index matching body sample. In Comparative Example 2, the different point from Examples 1 to 4 is that the stress-strain relaxation agent is not added.

With regard to the refractive-index matching body sample, an optical transmittance thereof is measured 93 to 95% by a spectrophotometer in the wavelength range of 1300 to 1600 nm. Further, a refractive index thereof is measured in the range of 1.465±0.005 by an Abbe refractometer at room temperature (23±2° C.). A breaking elongation thereof is measured in the range of 200 to 300%. A glass adhesive force thereof is measured in the range of 500 to 1000 g/10 mm width.

Then, an optical connector as shown in FIG. 1 is produced by using the above no stress-strain relaxation agent-added cross-linkable refractive index matching agent. The production method thereof is the same as Example 1, and ten of the optical connectors are produced thereby. Then, as in Examples 1 to 4, the external optical fiber is connected to the optical connector and is analyzed with the same tests and measurements whose results (Comparative Example 2) are shown in Table 1 as above.

Comparative Example 3

As the cross-linkable refractive index matching agent, 50% ethyl acetate solution of acrylic resin is used that includes n-butyl acrylate/methyl acrylate/acrylic acid/2-hydroxyethyl methacrylate copolymer (compounding ratio=82/15/2.7/0.3 parts by weight).

As the stress-strain relaxation agent, a silicone oil (TSK5353: available from GE Toshiba Silicones (Momentive Performance Materials Inc.)) is used.

To 100 parts by weight of the cross-linkable refractive index matching agent, 0.5 parts by weight of the stress-strain relaxation agent and 1.0 part by weight of cross-linking agent (product name: CORONATE®, available from Nippon Polyurethane Industry Co., Ltd.) are added and mixed. The mixed acrylic adhesive agent coating solution (or stress-strain relaxation agent-added cross-linkable refractive index matching agent) is solely cross-linked and hardened to have a refractive-index matching body sample. In Comparative Example 3, the different point from Examples 1 to 4 is that the stress-strain relaxation agent is added as little as 0.5 parts by weight.

With regard to the refractive-index matching body sample, an optical transmittance thereof is measured 93 to 95% by a spectrophotometer in the wavelength range of 1300 to 1600 nm. Further, a refractive index thereof is measured in the range of 1.465±0.005 by an Abbe refractometer at room temperature (23±2° C.). A breaking elongation thereof is measured in the range of 200 to 300%. A glass adhesive force thereof is measured in the range of 500 to 1000 g/10 mm width.

Then, the optical connector as shown in FIG. 1 is produced by using the above stress-strain relaxation agent-added cross-linkable refractive index matching agent. The production method thereof is the same as Example 1, and ten of the optical connectors are produced thereby. Then, as in Examples 1 to 4, the external optical fiber is connected to the optical connector and is analyzed with the same tests and measurements whose results (Comparative Example 3) are shown in Table 1 as above.

Comparative Example 4

As the cross-linkable refractive index matching agent, 50% ethyl acetate solution of acrylic resin is used that includes n-butyl acrylate/methyl acrylate/acrylic acid/2-hydroxyethyl methacrylate copolymer (compounding ratio=82/15/2.7/0.3 parts by weight).

As the stress-strain relaxation agent, a silicone oil (TSK5353: available from GE Toshiba Silicones (Momentive Performance Materials Inc.)) is used.

To 100 parts by weight of the cross-linkable refractive index matching agent, 35 parts by weight of the stress-strain relaxation agent and 1.0 part by weight of cross-linking agent (product name: CORONATE®, available from Nippon Polyurethane Industry Co., Ltd.) are added and mixed. The mixed acrylic adhesive agent coating solution (or stress-strain relaxation agent-added cross-linkable refractive index matching agent) is solely cross-linked and hardened to have a refractive-index matching body sample. In Comparative Example 4, the different point from Examples 1 to 4 is that the stress-strain relaxation agent is added as much as 35 parts by weight.

With regard to the refractive-index matching body sample, an optical transmittance thereof is measured 93 to 95% by a spectrophotometer in the wavelength range of 1300 to 1600 nm. Further, a refractive index thereof is measured in the range of 1.465±0.005 by an Abbe refractometer at room temperature (23±2° C.). A breaking elongation thereof is measured in the range of 100 to 200%. A glass adhesive force thereof is measured in the range of 20 to 100 g/10 mm width.

Then, the optical connector as shown in FIG. 1 is produced by using the above stress-strain relaxation agent-added cross-linkable refractive index matching agent. The production method thereof is the same as Example 1, and ten of the optical connectors are produced thereby. Then, as in Examples 1 to 4, the external optical fiber is connected to the optical connector and is analyzed with the same tests and measurements whose results (Comparative Example 4) are shown in Table 1 as above.

The test results in Table 1 will be evaluated below. In Comparative Example 1 using the non-cross-liking refractive index matching agent, even in test (2) where it is left at room temperature for 24 hours, it is subject to an increase in loss of 1 dB or more, and, in the various temperature and humidity tests (4) to (7), it is subject to an increase in loss of 1 dB or more. In contrast, Examples 1 to 4 and Comparative Examples 2 to 4 using the cross-linkable refractive index matching agent have an increase in loss as small as 0.3 dB or less for all the tests, so that it will be appreciated that they can keep excellent optical transmission characteristics in various temperature and humidity environments.

In Comparative Examples 2 and 3, since the stress-strain relaxation agent is added small in amount, a period (test (3)) from the connection until the return loss is stabilized is long. In Examples 1 to 4 with a suitable amount of the stress-strain relaxation agent added, the period from the connection until the return los is stabilized is significantly short, so that it will be appreciated that they are excellent in stability. On the other hand, in Comparative Example 4 with an excessive amount of the stress-strain relaxation agent added, it is confirmed that the refractive-index matching body is peeled off during the repeated connections (test (8)).

After the tests, the optical connectors in Examples 1 to 4 and Comparative Examples 1 to 4 are broken to check the hole portion of the external optical fiber as a holy fiber. In Comparative Example 1, it is confirmed that the non-cross-linking refractive index matching agent penetrates thereinto by several millimeters to tens of millimeters. In Examples 1 to 4 and Comparative Examples 2 and 3 using the cross-linkable refractive index matching agent, it is confirmed that the cross-linkable refractive index matching agent penetrates thereinto only by the attached thickness at a maximum. In Comparative Example 4, it is confirmed that the silicone oil used as the stress-strain relaxation agent penetrates thereinto by hundreds of micrometers.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical connector comprising:
   a ferrule;
   an optical fiber connector disposed at a back end of the ferrule;
   an internal optical fiber inserted into the ferrule and the optical fiber connector, the internal optical fiber being adapted to butt-connect at a back end face thereof to an external optical fiber to be inserted into the optical fiber connector; and
   a refractive-index matching body attached to the back end face of the internal optical fiber,
   wherein the refractive-index matching body comprises a stress-strain relaxation agent and a cross-linked and hardened cross-linkable refractive-index matching agent comprising a base organic material, and
   wherein a rate of change in refractive-index relative to temperature of the refractive-index matching body is in a range of ±2% at a temperature of −40 to 70° C.

2. The optical connector according to claim 1, wherein:
   the stress-strain relaxation agent comprises a silicone-based oil or a silicone gel.

3. The optical connector according to claim 1, wherein:
   the stress-strain relaxation agent comprises a refractive-index in a range of 1.46±0.05.

4. The optical connector according to claim 1, wherein:
   the stress-strain relaxation agent is added in a range of 1 to 30% by weight to the cross-linkable refractive-index matching agent.

5. The optical connector according to claim 1, wherein:
   the refractive-index matching body has the refractive-index in a range of 1.46±0.05, an optical transmittance of not less than 80%, a breaking elongation of not less than 50%, and a glass adhesive force of not less than 50 g/10 mm width.

6. The optical connector according to claim 1, wherein:
   the refractive-index matching body comprises a thickness of 5 to 50 μm.

7. The optical connector according to claim 1, wherein:
   the refractive-index matching body comprises a spherical surface.

8. The optical connector according to claim 1, wherein:
   the refractive-index matching body is attached only to the back end face of the internal optical fiber.

9. The optical connector according to claim 1, wherein:
   the refractive-index matching body is attached to the back end face and a side of the internal optical fiber.

10. The optical connector according to claim 1, wherein:
    the optical fiber connector comprises a groove that comprises a section area greater than that of the external optical fiber, the groove being adapted to house a part of the external optical fiber.

11. The optical connector according to claim 10, wherein:
    the groove comprises a V-groove.

12. The optical connector according to claim 1, wherein:
    the external optical fiber comprises a holey fiber.

13. The optical connector according to claim 1, wherein:
    the base organic material of the cross-linkable refractive-index matching agent changes from a liquid form into a solid form by cross-linking and hardening.

14. The optical connector according to claim 1, wherein:
    the stress-strain relaxation agent is dispersed in the base organic material of the cross-linkable refractive-index matching agent.

15. The optical connector according to claim 1, wherein:
    the stress-strain relaxation agent is non-crosslinkable with the base organic material of the cross-linkable refractive-index matching agent.

16. The optical connector according to claim 1, wherein:
    the base organic material comprises an organic material selected from acrylic-based, epoxy-based, vinyl-based, ethylene-based, silicone-based, urethane-based, polyamide-based, fluorine-based, polybutadiene-based, and polycarbonate-based materials.

17. The optical connector according to claim 2, wherein:
    the silicone gel comprises a three-dimensional cross linkage or a noncovalently-bonded and physical cross linkage.

18. The optical connector according to claim 1, wherein:
    the internal optical fiber is configured to butt-connect at the back end face thereof to an external holey fiber to be inserted into the optical fiber connector.

19. An optical connector comprising:
    a ferrule;
    an optical fiber connector disposed at a back end of the ferrule;
    an internal optical fiber inserted into the ferrule and the optical fiber connector, the internal optical fiber being adapted to butt-connect at a back end face thereof to an external optical fiber to be inserted into the optical fiber connector; and
    a refractive-index matching body attached to the back end face of the internal optical fiber,
    wherein the refractive-index matching body comprises a stress-strain relaxation agent and a cross-linked and hardened cross-likable refractive-index matching agent comprising a base organic material which changes from a liquid form into a solid form by cross-linking and hardening.

20. The optical connector according to claim 19, wherein:
    the external optical fiber comprises a holey fiber.

21. The optical connector according to claim 19, wherein:

the stress-strain relaxation agent is non-crosslinkable with the base organic material of the cross-linkable refractive-index matching agent.

22. The optical connector according to claim 19, wherein:
the internal optical fiber is configured to butt-connect at the back end face thereof to an external holey fiber to be inserted into the optical fiber connector.

23. An optical connector comprising:
a ferrule;
an optical fiber connector disposed at a back end of the ferrule;
an internal optical fiber inserted into the ferrule and the optical fiber connector, the internal optical fiber being adapted to butt-connect at a back end face thereof to an external optical fiber to be inserted into the optical fiber connector; and
a refractive-index matching body attached to the back end face of the internal optical fiber,
wherein the refractive-index matching body comprises a cross-linked and hardened cross-linkable refractive-index matching agent and a stress-strain relaxation agent,
wherein the stress-strain relaxation agent is configured to relax a stress-strain caused by butt-connecting the internal optical fiber and the external optical fiber.

24. The optical connector according to claim 23, wherein:
the external optical fiber comprises a holey fiber.

25. The optical connector according to claim 23, wherein:
the stress-strain relaxation agent is non-crosslinkable with a base organic material of the cross-linkable refractive-index matching agent.

26. The optical connector according to claim 23, wherein:
the internal optical fiber is configured to butt-connect at the back end face thereof to an external holey fiber to be inserted into the optical fiber connector.

\* \* \* \* \*